US008254206B2

(12) United States Patent
Morley

(10) Patent No.: US 8,254,206 B2
(45) Date of Patent: Aug. 28, 2012

(54) WIDE TOW ENABLED BY MULTICOMPONENT MARINE SEISMIC CABLE

(75) Inventor: Lawrence C. Morley, The Woodlands, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/251,321

(22) Filed: Oct. 14, 2008

(65) Prior Publication Data

US 2009/0040871 A1   Feb. 12, 2009

(51) Int. Cl.
*G01V 1/00* (2006.01)
(52) U.S. Cl. ............................... 367/20; 367/21
(58) Field of Classification Search ............... 367/20, 367/21
See application file for complete search history.

(56) References Cited

U.S. PATENT DOCUMENTS

| | | | | | |
|---|---|---|---|---|---|
| 5,693,885 | A | * | 12/1997 | Neidell | ............ 73/597 |
| 6,510,390 | B1 | | 1/2003 | Bunting et al. | |
| 2004/0196738 | A1 | * | 10/2004 | Tal-Ezer | ............ 367/51 |

FOREIGN PATENT DOCUMENTS

GB          2414299 A   * 11/2005

OTHER PUBLICATIONS

Examination Report of European Application Serial No. 07799213.9 dated Mar. 21, 2012.

"Calibrated Marine Source (CMS)-Q-Technology for Accurate Shot-By-Shot Designature," Schlumberger Limited, downloaded on May 2, 2006: p. 1, <http://www.westerngeco.com/content/services/dp/omega/signal/cms.asp>.
Abma et al., "Comparisons of interpretation methods in the presence of aliased events," 2003 SEG Annual Meeting, SEG Expanded Extracts, Oct. 2003, vol. 22: pp. 1909-1912.
"Q-Marine—Advanced Seismic Technology for the 21st Century," Schlumberger Limited, downloaded on May 2, 2006: p. 1, <http://www.westerngeco.com/content/services/q_technology/q_marine/index.asp>.
"Q-Technology-Raising the Standards of Seismic Data Quality," Schlumberger Limited, downloaded on May 2, 2006, p. 1, <http://www.westerngeco.com/content/services/q_technology/index.asp>.
Kraaijpoel, Seismic ray fields and ray field maps: theory and algorithms, University of Utrecht, Apr. 28, 1974: pp. 1-178.
Ronen, "Wave-equation trace interpolation," Geophysics, Jul. 1987, vol. 52(7): pp. 973-984.

* cited by examiner

*Primary Examiner* — Mark Hellner

(57) ABSTRACT

A technique for use in towed-array, marine seismic surveys includes a method and an apparatus. The method includes accessing a set of multicomponent seismic data acquired in a wide tow, marine seismic survey; and interpolating a set of seismic data from the acquired seismic data in the crossline direction such that the combined acquired and interpolated seismic data meet the discrete spatial sampling theory requirements for array detection of broadside seismic signal and the discrimination and suppression of broadside linear noise. In some aspects, the technique includes programmed storage media and/or programmed computers for use in executing such a method. The apparatus is a wide tow array, including a plurality of streamers spaced apart by a cable separation exceeding the maximum cable spacing for array detection of broadside seismic signal and the discrimination and suppression of broadside linear noise as determined by discrete spatial sampling theory.

28 Claims, 4 Drawing Sheets

WIDE TOW ENABLED BY MULTICOMPONENT MARINE SEISMIC CABLE

The earlier effective filing date of co-pending U.S. application Ser. No. 11/456,081, entitled "Wide-Tow Enabled By Multi-Component Marine Seismic Cable", and filed Jul. 6, 2006, in the name of the inventor Lawrence C. Morley, is hereby claimed under 35 U.S.C. §120 for all common subject matter. This application is also hereby incorporated by reference for all purposes as if set forth verbatim herein.

BACKGROUND OF THE INVENTION

1. Field of the Invention

The present invention pertains to marine seismic surveying and, in particular, to towed-array surveys.

2. Description of the Related Art

Seismic exploration involves surveying subterranean geological formations for hydrocarbon deposits. A survey typically involves deploying acoustic source(s) and acoustic sensors at predetermined locations. The sources impart acoustic waves into the geological formations. The acoustic waves are sometimes also referred to as "pressure waves" because of the way they propagate. Features of the geological formation reflect the pressure waves to the sensors. The sensors receive the reflected waves, which are detected, conditioned, and processed to generate seismic data. Analysis of the seismic data can then indicate probable locations of the hydrocarbon deposits.

Some surveys are known as "marine" surveys because they are conducted in marine environments. Note that marine surveys may be conducted not only in saltwater environments, but also in fresh and brackish waters. One type of marine survey may be referred to as a "towed-array" survey. In a towed-array survey, a survey vessel tows an array of seismic cables extending linearly from the stern of the survey vessel. Each seismic cable, or "streamer", includes a variety of instruments that provide a number of functions. Some of these instruments, typically acoustic receivers called "hydrophones", receive the reflected waves and generate data as described above.

In conventional towed-array surveys, the seismic cables are commonly towed some 50-100 meters apart. This design specification arises from the theory of discrete spatial sampling, which dictates the maximum cable spacing for array detection of broadside seismic signal and the discrimination and suppression of broadside linear noise. The maximum cable separation, in turn, imposes a limit on overall cross-line receiver array coverage, since the total number of seismic cables is constrained by the towing capacity of any given seismic vessel.

This limitation on cable separation has a number of important consequences. For instance, it limits the maximum spread of the array, which increases the number of passes the survey vessel and towed array must make to cover the survey array. This increases the cost of the survey. It also imposes technological constraints on the survey. For instance, it limits the angle of incidence for the acoustic waves both at reflectors in the subterranean geological formation as well as the receivers of the streamers.

The present invention is directed to resolving, or at least reducing, one or all of the problems mentioned above.

SUMMARY OF THE INVENTION

The invention includes, in its many aspects and embodiments, a method and apparatus for use in towed-array, marine seismic surveys. More particularly, the method comprises: accessing a set of multicomponent seismic data acquired in a wide tow, marine seismic survey; and interpolating a set of seismic data from the acquired seismic data in the crossline direction such that the combined acquired and interpolated seismic data meet the discrete spatial sampling theory requirements for array detection of broadside seismic signal and the discrimination and suppression of broadside linear noise. In some aspects, the invention includes programmed storage media and/or programmed computers for use in executing such a method. The apparatus is a wide tow array, comprising a plurality of streamers spaced apart by a cable separation exceeding the maximum cable spacing for array detection of broadside seismic signal and the discrimination and suppression of broadside linear noise as determined by discrete spatial sampling theory.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In general, and in a first aspect, the invention includes a method and apparatus by which seismic data is acquired using a "wide tow" array. A "wide tow" array is one in which exceeds the maximum cable spacing for array detection of broadside seismic signal and the discrimination and suppression of broadside linear noise as determined by discrete spatial sampling theory. In general, this means that array in which crossline cable spacing exceeds approximately 100 m. Additional data is interpolated/extrapolated from that which is acquired to meet the technical requirements of discrete spatial sampling theory. The acquired data and interpolated extrapolated together then reasonably approximates the data resulting from a conventional towed-array survey. However, the combined data can be acquired much more economically and provides technical advantages over conventionally acquired towed-array data.

Figure 1A:
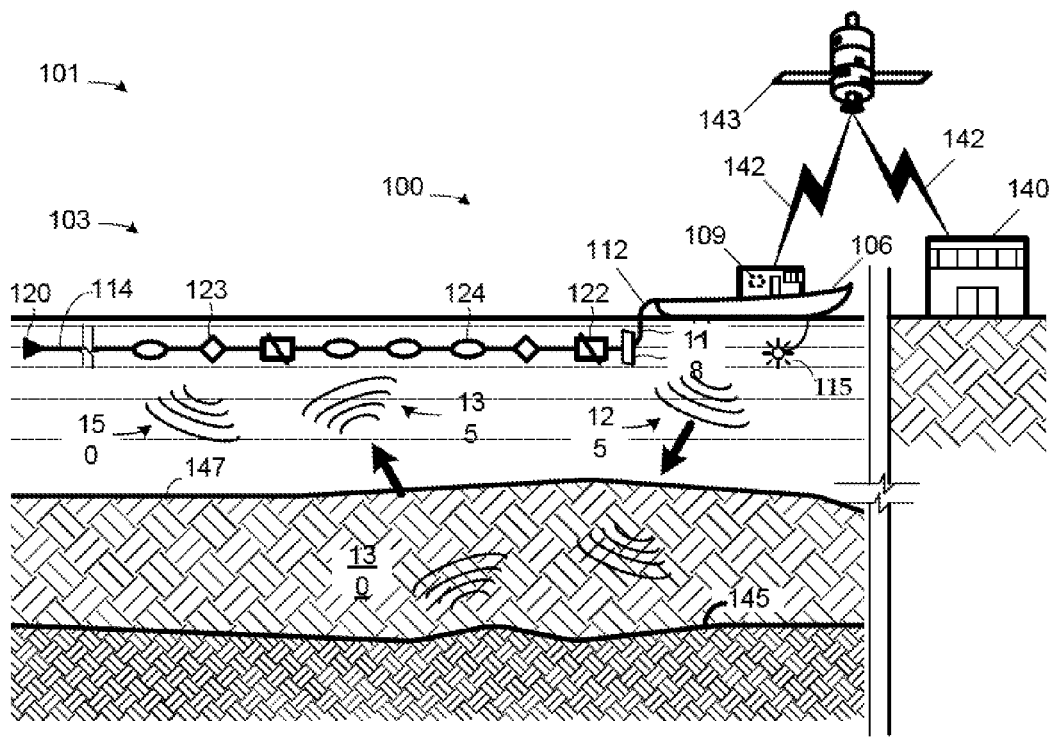
FIG. 1A and FIG. 1B depict a marine seismic survey practiced in accordance with one aspect of the present invention.
Figure 1B:
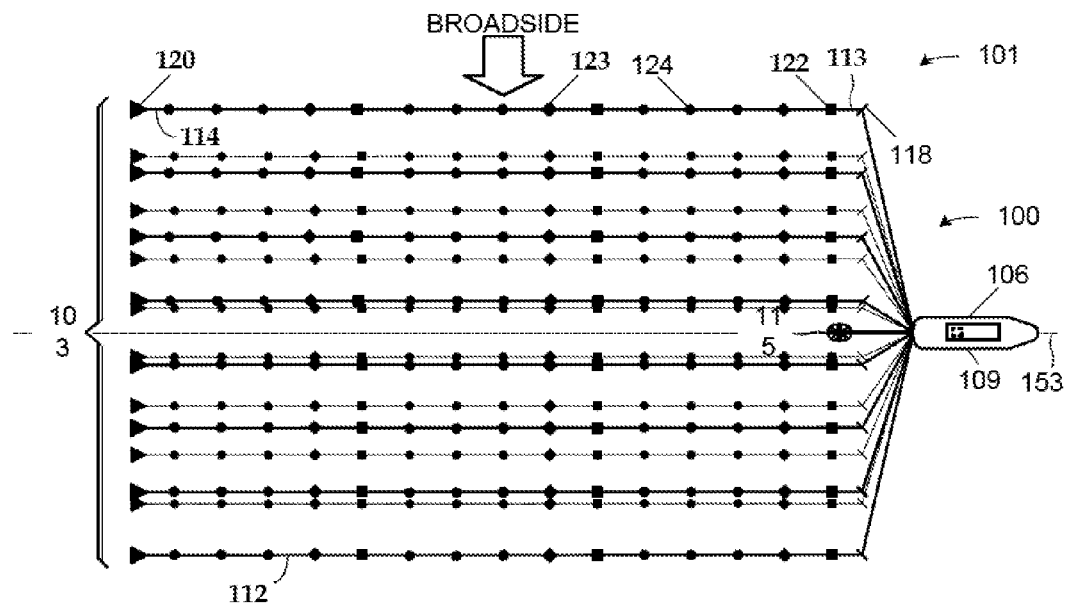

In the illustrated embodiment, the method is dependent on the acquisition of multicomponent seismic data because of the interpolation/extrapolation technique, discussed further below, employed. FIG. 1A and FIG. 1B illustrate a towed-array survey system 100 in a towed-array survey 101, both of which are exemplary embodiments of their respective aspects of the present invention. In this particular embodiment, the survey system 100 generally includes an array 103 towed by a survey vessel 106 on board of which is a computing apparatus 109. The towed array 103 comprises eight marine streamers 112 (only one indicated) that may, for instance, each be 6 km long. Note that the number of streamers 112 in the towed array 103 is not material to the practice of the invention. Thus, alternative embodiments may employ different numbers of streamers 112. In some embodiments, the outermost streamers 112 in the array 103 could be, for example, as much as 770 m-1,120 m apart, as opposed to conventional distances of, for example, 700 m.

Note that these distances discussed herein are "approximate." As used herein, the term "approximate" acknowledges that which is commonly known in the art—namely, that it is difficult to consistently maintain the position of the streamers 112 throughout the entire seismic survey 101. Environmental conditions, such as tides and winds, frequently push all or parts of the streamers 112 out of their desired positions during the seismic survey 101. Accordingly, as is discussed further below, the streamers 112 include positioning devices to help offset these types of factors. Deviations from desired positions nevertheless occur and they may affect the crossline cable separation. The term "approximately" is a reflection of this reality and indicates that deviations from the modified distance that are within a degree commonly accepted by those in the industry in this context.

The towed array 103 is a "wide" array because the streamers 112 are spaced apart by a "wide" crossline cable separation. As those in the art will appreciate, the maximum cable separation is a function of the frequency of the seismic signal(s) with which the survey 101 is conducted. Thus, the exemplary, conventional crossline cable separation of 100 m mentioned above is determined from the frequencies of signals typically used in conventional practice, e.g., 6 Hz-120 Hz. Similarly, the exemplary crossline spread of 770 m-910 m is a function of those same frequencies. If significantly different frequencies are used for the seismic survey signal, the actual distance of the maximum crossline separation will vary accordingly. Whether a crossline separation is "wide" in accordance with the present invention is therefore not so much a function of distance, but rather a function of the distance relative to the distance achieved in conventional practice without the practice of the invention.

A seismic source 115 is also shown being towed by the survey vessel 106. Note that, in alternative embodiments, the seismic source 115 may not be towed by the survey vessel 106. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 115 may be implemented using any such source known to the art. In the illustrated embodiment, the seismic source 115 comprises an air gun or an array of air guns At the front of each streamer 112 is a deflector 118 (only one indicated) and at the rear of every streamer 112 is a tail buoy 120 (only one indicated). The deflector 118 laterally, or in the crossline direction, positions the front end 113 of the streamer 112 nearest the survey vessel 106. The tail buoy 120 creates drag at the tail end 114 of the streamer 112 farthest from the survey vessel 106. The tension created on the streamer 112 by the deflector 118 and the tail buoy 120 results in the roughly linear shape of the streamer 112 shown in FIG. 1.

Located between the deflector 118 and the tail buoy 120 are a plurality of seismic cable positioning devices known as "birds" 122. The birds 122 may be located at regular intervals along the seismic cable, such as every 200 to 400 meters. In this particular embodiment, the birds 122 are used to control the depth at which the streamers 112 are towed, typically a few meters. In one particular embodiment, the steerable birds 118 are implemented with Q-fin™ steerable birds as are employed by Western Geco, the assignee hereof, in their seismic surveys.

The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Øyvind Hillesund et al. ("the '895 application"). However, any type of steerable device may be employed. For instance, a second embodiment is disclosed in PCT International Application No. WO 98/28636, entitled "Control Devices for Controlling the Position of a Marine Seismic Streamer", filed Dec. 19, 1997, in the name of Geco AS as assignee of the inventor Simon Bittleston ("the '636 application"). In some embodiments, the birds 118 may even be omitted.

Figure 2:
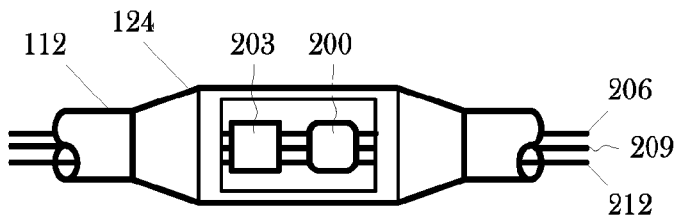
FIG. 2 conceptually depicts a sensor arrangement for the marine seismic survey of FIG. 1A and FIG. 1B.

The streamers 112 also include a plurality of instrumented sondes 124 (only one indicated) distributed along their length. The instrumented sondes 124 house, in the illustrated embodiment, an acoustic sensor 200 (e.g., a hydrophone) such as is known to the art, and a particle motion sensor 203, both conceptually shown in FIG. 2. The particle motion sensors 203 measure not only the magnitude of passing wavefronts, but also their direction. The sensing elements of the particle motions sensors may be, for example, a velocity meter or an accelerometer. Suitable particle motion sensors are disclosed in:

U.S. application Ser. No. 10/792,511, entitled "Particle Motion Sensor for Marine Seismic Sensor Streamers," filed Mar. 3, 2004, in the name of the inventors Stig Rune Lennart Tenghamn and Andre Stenzel (published Sep. 8, 2005, as Publication No. 2005/0194201);

U.S. application Ser. No. 10/233,266, entitled "Apparatus and Methods for Multicomponent Marine Geophysical Data Gathering," filed Aug. 30, 2002, in the name of the inventors Stig Rune Lennart Tenghamn et al. (published Mar. 4, 2004, as Publication No. 2004/0042341); and U.S. Pat. No. 3,283,293, entitled "Particle Velocity Detector and Means for Canceling the Effects of Motional Disturbances Applied Thereto," naming G. M. Pavey, Jr. et al. as inventors, and issued Nov. 1, 1966.

Any suitable particle motion sensor known to the art may be used to implement the particle motion sensor 203. Thus, it would be possible to distinguish data representing upwardly propagating wavefronts, such as the reflections 135, from the downwardly propagating wavefronts, such as the multiple reflection 150.

In general, it is desirable for the noise measurements of the particle motion sensors 203 be taken as close to the point the seismic data is acquired by the acoustic sensors 200 as is reasonably possible. More distance between the noise data acquisition and the seismic data acquisition will mean less accuracy in the measurement of noise at the point of seismic data acquisition. However, it is not necessary that the particle motion sensor 203 be positioned together with the acoustic sensor 200 within the sensor sonde 124. The particle motion sensor 203 need only be located sufficiently proximate to the acoustic sensor 200 that the noise data it acquires reasonably represents the noise component of the acquired seismic data.

The sensors of the instrumented sondes 124 then transmit data representative of the detected quantity over the electrical leads of the streamer 112. The data from the acoustic sensors 200 and the particle motion sensors 203 may be transmitted over separate lines. However, this is not necessary to the practice of the invention. However, size, weight and power constraints will typically make this desirable. The data generated by the particle motion sensor 203 will therefore need to be interleaved with the seismic data. Techniques for interleaving information with this are known to the art. For instance, the two kinds of data may be multiplexed. Any suitable techniques for interleaving data known to the art may be employed.

Thus, the data generated by the sensors of the instrumented sondes 124 is transmitted over the seismic cable to the computing apparatus 109. As those in the art will appreciate, a variety of signals are transmitted up and down the streamer 112 during the seismic survey. For instance, power is transmitted to the electronic components (e.g., the acoustic sensor 200 and particle motion sensor 203), control signals are sent to positioning elements (not shown), and data is transmitted back to the vessel 110. To this end, the streamer 112 provides a number of lines (i.e., a power lead 206, a command and control line 209, and a data line 212) over which these signals may be transmitted. Those in the art will further appreciate that there are a number of techniques that may be employed that may vary the number of lines used for this purpose. Furthermore, the streamer 112 will also typically include other structures, such as strengthening members (not shown), that are omitted for the sake of clarity.

Returning to FIG. 1A and FIG. 1B, the computing apparatus 109 receives the seismic data (hydrophone as well as particle motion sensor data), and records it. particle motion sensor data is recorded in, for example, a data storage in any suitable data structure known to the art. The particle motion sensor data can then be processed along with the hydrophone data to for instance suppress unwanted multiples. The computing apparatus 109 interfaces with the navigation system (not shown) of the survey vessel 106. From the navigation system, the computing apparatus 109 obtains estimates of system wide parameters, such as the towing direction, towing velocity, and current direction and measured current velocity.

In the illustrated embodiment, the computing apparatus 109 monitors the actual positions of each of the birds 122 and is programmed with the desired positions of or the desired minimum separations between the streamers 112. The horizontal positions of the birds 122 can be derived using various techniques well known to the art. The vertical positions, or depths, of the birds 122 are typically monitored using pressure sensors (not shown) attached to the birds 122.

Although drag from the tail buoy 120 tends to keep the streamers 112 straight, and although the birds 122 can help control the position of the streamers 112, environmental factors such as wind and currents can alter their shape. This, in turn, affects the position of the instrumented sondes 124 and, hence, the sensors 200, 203 (shown in FIG. 2). The shape of the streamer 112 may be determined using any of a variety of techniques known to the art. For instance, satellite-based global positioning system equipment can be used to determine the positions of the equipment. The Global Positioning System ("GPS"), or differential GPS, are useful, with GPS receivers (not shown) at the front and tail of the streamer. In addition to GPS based positioning, it is known to monitor the relative positions of streamers and sections of streamers through an acoustic positioning system comprised of a network of sonic transceivers 123 (only one indicated) that transmit and receive acoustic or sonar signals.

Still referring to FIG. 1A-FIG. 1B, the survey vessel 106 tows the array 103 across the survey area in a predetermined pattern. The predetermined pattern is basically comprised of a plurality of "sail lines" along which the survey vessel 106 will tow the array 103. Thus, at any given time during the survey, the survey vessel 106 will be towing the array 103 along a predetermined sail line 153. The seismic source 115 generates a plurality of seismic survey signals 125 in accordance with conventional practice as the survey vessel 106 tows the array 103. The seismic survey signals 125 propagate and are reflected by the subterranean geological formation 130. The geological formation 130 presents a seismic reflector 145. As those in the art having the benefit of this disclosure will appreciate, geological formations under survey can be much more complex. For instance, multiple reflectors presenting multiple dipping events may be present. FIG. 1A-FIG. 1B omit these additional layers of complexity for the sake of clarity and so as not to obscure the present invention. The sensors 200, 203 detect the reflected signals 135 from the geological formation 130 in a conventional manner.

The sensors 200, 203 (shown in FIG. 2) in the instrumented sondes 124 then generate data representative of the reflections 135, and the seismic data is embedded in electromagnetic signals. Note that the generated data is multicomponent seismic data, and that, in this particular embodiment, it includes pressure data and particle motion data. The signals generated by the sensors 200, 203 are communicated to the computing apparatus 109. The computing apparatus 109 collects the seismic data for processing. The computing apparatus 109 is centrally located on the survey vessel 110. However, as will be appreciated by those skilled in the art, various portions of the computing apparatus 109 may be distributed in whole or in part, e.g., across the seismic recording array 105, in alternative embodiments.

The computing apparatus 109 may process the seismic data itself, store the seismic data for processing at a later time, transmit the seismic data to a remote location for processing, or some combination of these things. Typically, processing occurs on board the survey vessel 106 or at some later time rather than in the survey vessel 106 because of a desire to maintain production. The data may therefore be stored on a portable magnetic storage medium (not shown) or wirelessly transmitted from the survey vessel 106 to a processing center 140 for processing in accordance with the present invention. Typically, in a marine survey, this will be over satellite links 142 and a satellite 143. Note that some alternative embodiments may employ multiple data collection systems 120.

Figure 3:
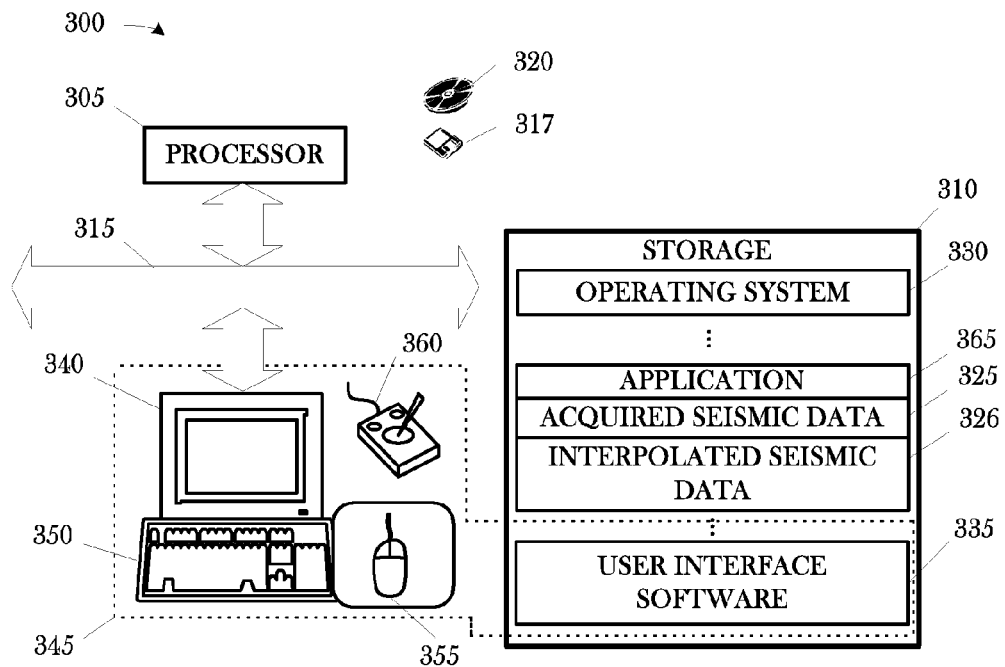
FIG. 3 shows selected portions of the hardware and software architecture of a computing apparatus such as may be employed in some aspects of the present invention.

In one aspect, the present invention is a software implemented method. FIG. 3 shows selected portions of the hardware and software architecture of a computing apparatus 300 such as may be employed in some aspects of the present invention. The computing apparatus 300 includes a processor 305 communicating with storage 310 over a bus system 315. The storage 310 may include a hard disk and/or random access memory ("RAM") and/or removable storage such as a floppy magnetic disk 317 and an optical disk 320.

The storage 310 is encoded with a acquired seismic data 325 and interpolated seismic data 326. The acquired seismic data 325 is acquired as discussed above relative to FIG. 2. The acquired seismic data 325 is multicomponent data and, in this particular embodiment, includes data from both of the sensors 200, 203. The interpolated seismic data 326 is also shown encoded on the storage 310 although, as will be discussed further below, this is not necessary to the practice of the invention.

The storage 310 is also encoded with an operating system 330, user interface software 335, and an application 365. The user interface software 335, in conjunction with a display 340, implements a user interface 345. The user interface 345 may include peripheral I/O devices such as a keypad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330. The application 365, when invoked, performs the method of the present invention. The user may invoke the application in conventional fashion through the user interface 345.

Figure 4:
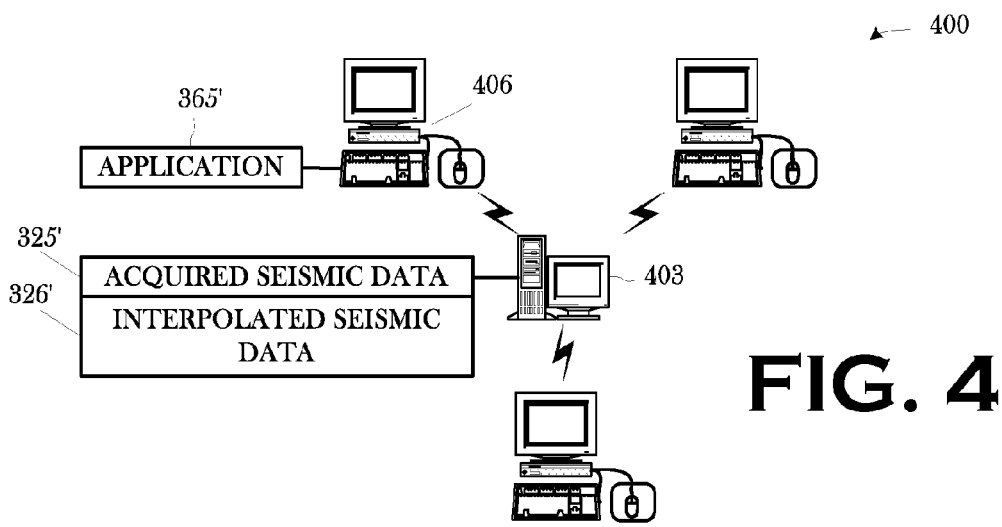
FIG. 4 depicts a computing system on which some aspects of the present invention may be practiced in some embodiments.

Note that there is no need for the acquired seismic data 325 to reside on the same computing apparatus 300 as the application 365 by which it is processed. Some embodiments of the present invention may therefore be implemented on a computing system, e.g., the computing system 400 in FIG. 4, comprising more than one computing apparatus. For example, the acquired seismic data 325 may reside in a data structure residing on a server 403 and the application 365' by which it is processed on a workstation 406 where the computing system 400 employs a networked client/server architecture. Furthermore, although the baseline set 326 is shown residing on the server 403, there is no requirement that the acquired seismic data 325 and the interpolated seismic data set 326 reside together.

However, there is no requirement that the computing system 400 be networked. Alternative embodiments may employ, for instance, a peer-to-peer architecture or some hybrid of a peer-to-peer and client/server architecture. The size and geographic scope of the computing system 400 is not material to the practice of the invention. The size and scope may range anywhere from just a few machines of a Local Area Network ("LAN") located in the same room to many hundreds or thousands of machines globally distributed in an enterprise computing system.

Returning to FIG. 3, the acquired seismic data 325 contains the multicomponent seismic data acquired as described above. Note that it is not necessary to the practice of the invention that the acquired seismic data 325 be freshly acquired. The acquired seismic data 325 may be "legacy" seismic data that has been archived for some time so long as it is multicomponent seismic data.

As has previously been noted, the cable separation of the streamers 112 in the towed array 103 exceeds the maximum cable spacing for array detection of broadside seismic signal and the discrimination and suppression of broadside linear noise as determined by discrete spatial sampling theory when conventionally processed. That is, the acquired seismic data 325 insufficiently samples the passing wavefront in the crossline direction. Thus, the present invention interpolates additional data, i.e., the interpolated seismic data 326, to offset this deficiency.

Thus, in one aspect, the invention includes wide tow array, comprising a plurality of streamers spaced apart by a cable separation exceeding the maximum cable spacing for array detection of broadside seismic signal and the discrimination and suppression of broadside linear noise as determined by discrete spatial sampling theory. In the wide tow array of the illustrated embodiment, the streamers comprise a cable; acoustic sensors disposed along the cable; particle motion sensors co-located the acoustic receivers; positioning devices; and position determining devices. Still in the illustrated embodiment, the wide tow array may include an acoustic source that emits seismic survey signals in the range of 0 Hz-200 Hz. Accordingly, the maximum cable separation by which the streamers are spaced apart exceeds approximately 100 m and may be in the range of approximately 110 m-130 m.

Figure 6:
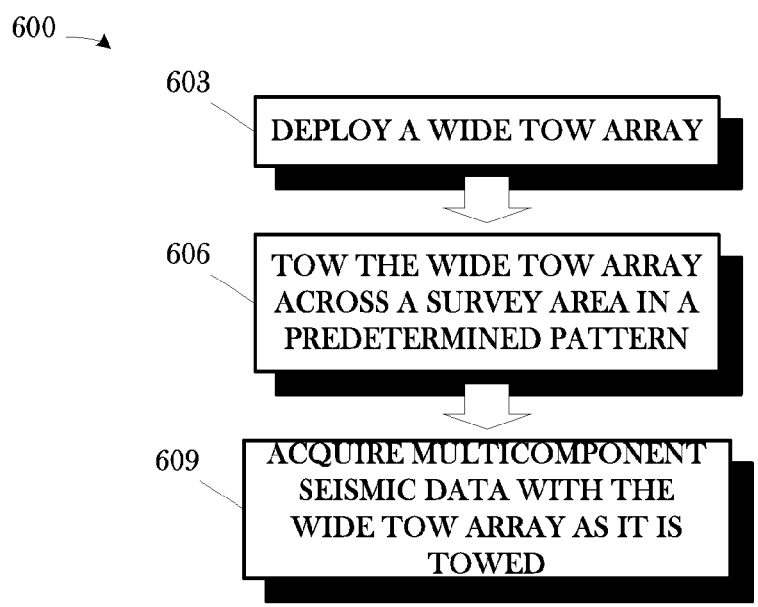
FIG. 6 illustrates one particular embodiment of a method practiced in accordance with one aspect of the present invention.

In another aspect, the invention includes a method 600, illustrated in FIG. 6, comprising deploying (at 603) a wide tow array; towing (at 606) the wide tow array across a survey area in a predetermined pattern; and acquiring (at 609) multicomponent seismic data with the wide tow array as it is towed. In the illustrated embodiment, deploying the wide tow array includes deploying an array of streamers with a maximum cable separation of approximately 110 m-approximately 130 m. Acquiring the multicomponent seismic data in the illustrated includes acquiring pressure data and particle motion data.

As previously mentioned, additional data over and above the acquired data is interpolated/extrapolated to meet the technical requirements of discrete spatial sampling theory. An interpolation technique described herein below permits the use of a maximum cable separation exceeding the maximum cable spacing for array detection of broadside seismic signal and the discrimination and suppression of broadside linear noise as determined by discrete spatial sampling theory. The art has since long experienced the need to interpolate or extrapolate trace recordings into areas void of receivers. Normally the wavefield and or its derivatives are only known at a number of discrete locations. However, in practice it is often desirable to extend the knowledge of the wavefield to other points using interpolation, extrapolation or a combination of extrapolation and interpolation, sometimes known as intrapolation. As used herein, the terms "interpolate" and "interpolation" will refer generally to any one of interpolation, extrapolation, and intrapolation unless noted otherwise to specifically mean interpolation to the exclusion of extrapolation and interpolation.

One suitable interpolation technique is disclosed in United Kingdom Patent Application GB 2 414 299 A, entitled "Interpolation and/or Extrapolation of Multi-Component Seismic Streamer Recordings", filed Jun. 21, 2004, filed in the name of Johan Olof Anders Robertsson, and published Nov. 23, 2005 ("the '299 application"). This application is hereby incorporated by reference as if expressly set forth verbatim herein for its teachings regarding interpolation intrapolation.

To further an understanding of the present invention, selected portions of the '299 application are excerpted herein. In this particular technique, the measured data from a multi-component streamer are used to derive a filter which interpolates or extrapolates pressure data away from the location of the streamer. The filter may be partially based on an expansion series of the pressure data. An expansion series is generally defined as a representation of the function or data set by means of a sum of increasing higher derivatives of the function or data set at a point or the space surrounding a point.

One of the most used expansion series is the Taylor series. Whereas Taylor series are generally not suitable for extrapolating oscillatory functions over great distances, this technique is based on the realization that in seismic applications the waves arrive at the receivers with near vertical incidence. For certain applications, in particular for intrapolation between known points of the data set, it is a preferred variant of the present invention to use a Taylor series with modified weighting, more preferably weighting known as barycentric or triangular weighting.

Though expansion series have been proposed in seismic theory, they were severely restricted in real application because such expansions lead to cross-line terms which are difficult to evaluate. Lack of accurate particle velocity caused further problems: without such data, the errors made by intra- and extrapolation render the results unreliable. It has now been found that multi-component streamers are capable of providing sufficiently accurate particle velocity related data either directly or indirectly. In one embodiment, first-order cross-line derivatives of data in the filter or expansion series are substituted by in-line measurements of wavefield quantities only. In another embodiment, second-order cross-line derivatives of data in the filter or expansion series are further substituted by in-line derivatives and measurements of wavefield quantities. The expansion series is accurate to a first-order, more preferably to the second-order expansion term. It is desirable to extend the series into the highest order permitted by the available measurements of wavefield quantities. However, the terms involve more and more complex derivatives of the measured data. Hence such an extension is preferably limited to the term which can be replaced or expressed in terms of accurately measured data.

Figure 5:
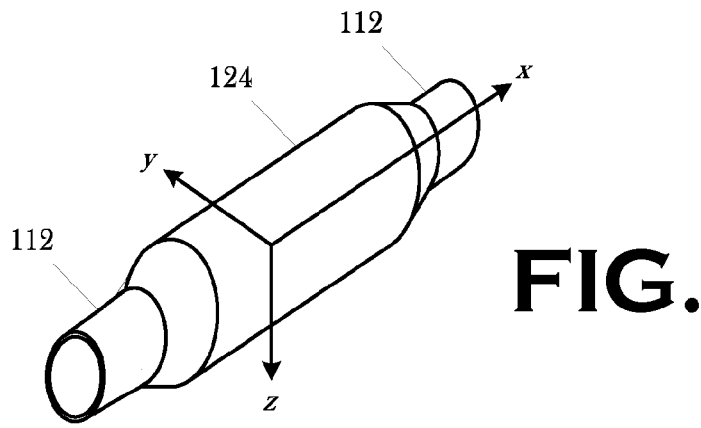
FIG. 5 illustrates the Cartesian coordinate system employed in the description of the illustrated embodiment.

More technically, during the survey 100, the source 115 is fired at intervals and the sensors 200, 203, shown in FIG. 2A, "listen" within a frequency and time window for acoustic signals such as reflected and/or refracted signals that are caused by seismic features in path of the emitted wavefield. As a result of such a survey, a set of pressure data P(x,y,t) and, by making use of the multi-component capability of the streamer, a set of velocity related data:

$$V(x,y,t)=(V_x(x,y,t),V_y(x,y,t),V_z(x,y,t)) \quad (1)$$

are obtained at locations x, y and times t. Note that the recorded data generally only available along 1D curves in 3D space following the streamers. Typically the streamers are approximately located in an xy-plane at roughly a constant depth z. The velocity is a vector with for example components in x, v and z directions. The coordinates are Cartesian coordinates, as illustrated in FIG. 5, with x as in-line direction, which is a direction parallel to the main axis of the streamer 112, and y as cross-line direction perpendicular to the streamer 112 axis and parallel to the (ideal) sea surface or plane in which the parallel streamers are towed. The z direction is taken to be vertical and orthogonal to x and y.

Applying the well-known Taylor's theorem, an analytic wavefield can be extrapolated away from a location where the wavefield and its derivatives are known:

$$P(x+\Delta x, y+\Delta y) = P(x,y) + [\Delta x \hat{o}_x P(x,y) + \Delta y \partial_y P(x,y)] + \quad (2)$$
$$\frac{1}{2!}[(\Delta x)^2 \partial_{xx} P(x,y) + 2\Delta x \Delta y \partial_{xy} P(x,y) + (\Delta y)^2 \partial_{yy} P(x,y)] +$$
$$\frac{1}{3!}[(\Delta x)^3 \partial_{xxx} P(x,y) + 3(\Delta x)^2 \Delta y \partial_{xxy} P(x,y) +$$
$$3\Delta x(\Delta y)^2 \partial_{xyy} P(x,y) + (\Delta y)^3 \partial_{yyy} P(x,)] + O(\Delta^4)$$

where $O(\Delta^n)$ indicates the order of terms neglected in the Taylor expansion (n=4 in Eq. (2)) and the operator $\partial_x$ denotes a spatial partial derivative—in this instance with respect to the x-direction. The Taylor series is infinite and is valid for extrapolation any distance away from the location where the wavefield and its derivatives are known. The range of the extrapolation is limited by truncating the Taylor series. In the following examples pressure data are extrapolated.

An application of the general equation of motion yields $$\partial_x P(x,y) = \rho \dot{V}_x(x,y), \quad (3)$$

and $$\partial_y P(x,y) = \rho \dot{V}_y(x,y), \quad (4)$$

where $\dot{V}_x$, $\dot{V}_y$ denote time derivatives of $V_x$ and $V_y$, respectively, and $\rho$ is the density of water. Using Eq. (4) to replace the cross-line derivative of the pressure, all the terms required for the first-order accurate Taylor expansion of pressure away from the multicomponent streamer are available:

$$P(x+\Delta x,y+\Delta y)=P(x,y)+[\Delta x \partial_x P(x,y)+\Delta y \rho \dot{V}_y(x,y)]+O(\Delta^2). \quad (5)$$

In Eq. (5), the option exists of expressing in-line derivatives with respect to pressure in terms of derivatives of in-line component of particle velocity through Eq. (3). However, in the examples, the in-line derivatives of pressure are used throughout. A variant of Eq. (5) can be applied to expansions into z-direction.

The second-order cross-line derivative of pressure from a multicomponent streamer towed in the vicinity of the sea surface (e.g., at 6 m depth) can be expressed as:

$$\partial_{yy} P(x,y) = \quad (6)$$
$$\frac{3}{1+\frac{2}{15}k^2h^2}\left[\frac{k\cot(kh)}{h}P(x,y)-\frac{i\omega\rho}{h}V_z(x,y)\right]-\partial_{xx}P(x,y)+O(h)$$

Eq. (6) is expressed in the space-frequency domain, h denotes the instantaneous depth of each recording element as a function of time and space, and k=ω/c is the wavenumber where ω is the angular frequency and c is the velocity in water. In order to be applicable for a time-variant rough sea, a space-time implementation using compact filters of Eq. (6) is used. This can be done successfully either by approximating the k-dependent terms by truncated Taylor expansions (equivalent to time-derivatives in the time domain) or by overlapping triangular windows where the wave-height is considered constant within each window.

Combining Eq. (2), Eq. (4), and Eq. (6), the Taylor expansion of pressure away from the multi-component streamer can be written as accurate up to the second order:

$$P(x+\Delta x, y+\Delta y) = P(x,y) + [\Delta x \hat{o}_x P(x,y) + \Delta y \rho \dot{V}_y(x,y)] + \quad (7)$$

-continued $$\frac{1}{2}\left[(\Delta x)^2 \partial_{xx} P(x,y) + 2\Delta x \Delta y \rho \partial_x \dot{V}_y(x,y)\right] +$$

$$\frac{(\Delta y)^2}{2}\left[\frac{3}{1+\frac{2}{15}k^2h^2}\left[\frac{k\cot(kh)}{h}P(x,y) - \frac{i\omega\rho}{h}V_z(x,y)\right] - \right.$$

$$\left.\partial_{xx}P(x,y)\right] + O(\Delta^3)$$

Having derived expressions of the first- and second-order Taylor expansion in terms of measurable data, these expressions can be applied as filter to various problems of interest to seismic exploration and data analysis. A practical filter may approximate analytical expressions such as derivatives by their corresponding finite difference approximations.

Thus, the applications for filters in accordance with the invention include generally the steps of obtaining the multi-component data using a multi-component streamer, using an expansion equation with cross-line terms replaced as described above, and using suitable computing devices to determine the inter- or extrapolated data.

The first of such problems relates to the interpolation and intrapolation of pressure data in the direction along a streamer so as to derive values of the dataset at points between the location of receivers. The problem of interpolating a wavefield between two points where the value of the wavefield and some of its derivatives are known is well-known in one dimension and is solved by fitting Hermite polynomials to the data.

The multi-component streamer will have some redundancy in in-line measurements if both P and $V_x$ are recorded. This redundancy may be exploited to attenuate noise in a multi-component streamer. For the case where there are recordings of both P and $V_x$ and in order to suppress noise on P by means of filtering the maximum required sensor spacing can be relaxed, if a sufficiently dense grid of data values can be generated through interpolation. As the noise on the geophone components will be spatially aliased, this method may require a model for predicting the noise on the geophone components once it is known on the pressure components.

Hermite polynomials allow us to interpolate P data from neighboring P and $V_x$ recordings between $x=x_0$ and $x=x_1$ even though the slowest propagating noise mode may be spatially aliased on the P recordings themselves:

$$P(x,y_0)=P(x_0,y_0)(2s^3-3s^2+1)+P(x_1,y_0)(-2s^3+3s^2)+\rho\dot{V}_x \\ (x_0,y_0)(s^3-2s^2+s)+\rho\dot{V}_x(x_1,y_0)(s^3-s^2) \quad (8)$$

where the Hermite polynoms are written as a function of:

$$s = \frac{(x-x_0)}{(x_1-x_0)} \quad (9)$$

A second application is the extrapolation away from a streamer.

To extrapolate pressure data away from a multicomponent steamer, but not into the direction of another multicomponent streamer, a one-dimensional Hermite interpolation can be applied along the streamer to the point along the streamer that has the shortest distance to the point to which the data is to be extrapolated. The interpolation along the streamer can be performed to an arbitrary degree of accuracy by computing derivatives in the streamer direction of the different terms needed for the Taylor extrapolation (Eq. (5) or Eq. (7)) with spectral accuracy, provided that the required terms are not spatially aliased. The Hermite interpolation, however, cannot be arbitrarily extended as by including ever higher-order derivatives more noise will be amplified.

The third problem relates to the interpolation and intrapolation of pressure data between two multi-component streamers. A Hermite interpolation can likely not be used cross-line in between the streamers as the terms for a subsequent Taylor extrapolation probably are aliased. Instead, one needs to derive a modified form of the Taylor intrapolation formulae to constrain the extrapolated wavefield between the neighboring streamers for this special case.

If the wavefield and its derivatives are known at the corners of a triangle and one would like to interpolate the wavefield to a point in the interior of the triangle, a first possible method is to use a 2D Taylor expansion for each of the three points (Eq. (1)) and then linearly interpolate or weight the three values according to their barycentric weights. However it has been shown that this will result in an intrapolated wavefield with one degree of accuracy less than what can be achieved if the Taylor expansion coefficients are modified slightly such that the interpolants are forced to fit the data at all corners of the triangle and not only one at a time. An example of the modified Taylor expansion can be found for example in a recent thesis by D. Kraaijpoel, "Seismic Ray Fields and Ray Field Maps: Theory and Algorithms", Utrecht University (2003).

Hence, to intrapolate the wavefield between two multi-component streamers the domain of receiver locations is triangulated such that each point in between the two streamers falls within a triangle with a receiver location at each corner. The wavefield is then extrapolated from each of the three recording locations to the interior point using the modified Taylor expansion. The data are then averaged using barycentric (triangular) weighting. The first- and second-order modified Taylor expansions of pressure are (see, for example, Kraaijpoel, 2003):

$$\tilde{P}(x+\Delta x, y+\Delta y) = P(x,y) + \frac{1}{2}\left[\Delta x \partial_x P(x,y) + \Delta y \rho \dot{V}_y(x,y)\right] + O(\Delta^2) \quad (10)$$

for the first-order expansion and as second-order expansion:

$$\tilde{P}(x+\Delta x, y+\Delta y) = P(x,y) + \frac{2}{3}\left[\Delta x \partial_x P(x,y) + \Delta y \rho \dot{V}_y(x,y)\right] + \quad (11)$$

$$\frac{1}{6}\left[(\Delta x)^2 \partial_{xx} P(x,y) + 2\Delta x \Delta y \rho \partial_x \dot{V}_y(x,y)\right] +$$

$$\frac{(\Delta y)^2}{6}\left[\frac{3}{1+\frac{2}{15}k^2h^2}\left[\frac{k\cot(kh)}{h}P(x,y) - \frac{i\omega\rho}{h}V_z(x,y)\right] - \right.$$

$$\left.\partial_{xx}P(x,y)\right] + O(\Delta^3).$$

There are different coefficients in front of the terms in Eq. (10) and Eq. (11) compared to the traditional Taylor expansions (Eq. (5) and Eq. (7)). Eq. (10) and Eq. (11) are best used when interpolating data in 2D and not for extrapolation. The triangularization can also be used when intrapolating between streamers on highly degenerated triangles. One side of such triangles is formed by the receiver spacing while the other two are determined by the much larger distance between streamers. Thus the above equations can be applied in the limit of $\Delta x \to 0$.

A fourth problem to which methods in accordance with the present invention can be applied is the intrapolation of pressure data at near source offsets.

This is a special case particularly important for applications in the field of multiple suppression. Generally, a survey obtains data from multiple adjacent streamers as shown in FIG. 1. But no data are available in the region closer to the source. However, at the source location symmetry conditions can be used in the interpolation such that the pressure data are symmetric across the location of the source. In other words, a Taylor expansion of the wavefield away from the source location will only contain even terms which are symmetric (pressure, second derivatives of pressure, etc.), but no odd terms which are anti-symmetric. The argument is correct for the direct wave and for the case of a one-dimensional (1D) model of the Earth but breaks down with variations in the sub surface. However, the symmetry is likely to be a strong additional constraint for extrapolation to near offsets. If the near-field source signature is known (e.g., by using the CMS™ technology of Western-Geco), then such information may be added to constrain the interpolation of the direct arrival.

Finally, another special case is that of a multi-component streamer towed parallel to a conventional streamer recording P data only (P and all in-line spatial derivatives are known). Also for this case a modified form of the Taylor intrapolation formulae as above to constrain the extrapolation is likely to benefit from the fact that the pressure wavefield and its in-line derivatives are known along the conventional streamer.

Thus, a multicomponent streamer contains pressure recordings as well as recordings of particle motion. The equation of motion teaches us how to compute the gradient of the pressure data straight from the particle motion recordings, see the '299 application. In addition as also noted in the '299 application, the Laplacian of the pressure wavefield can also be computed when the multicomponent streamer is towed in the vicinity of the sea surface. With first- and possibly higher-order derivatives of the pressure wavefield available we can rely on interpolation techniques to provide better spatially sampled data (according to the Nyquist sampling theorem) even though the multicomponent streamers themselves are spaced too far apart to allow for interpolation using the pressure data only.

Note, however, that the interpolation/extrapolation technique first disclosed in the '299 application is but one such technique with which the invention may be implemented. Other suitable techniques are known to the art from their use in other contexts. Any suitable technique known to the art may be used in interpolating/extrapolating the acquired multicomponent seismic data to the desired source/receiver locations.

Figure 7:
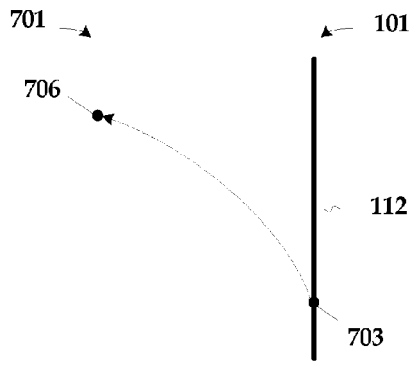
FIG. 7 graphically illustrates an interpolation for a single receiver position which may be iterated to meet the technical requirements of discrete spatial sampling theory.

FIG. 7 graphically illustrates one such interpolation for a single receiver position 703 in the seismic survey 101 to the corresponding receiver position 706 in the baseline survey 701. Note that the above interpolation/extrapolation technique disclosed above operates in multiple dimensions. In FIG. 7, the receiver positions 606 is interpolated in both inline and crossline directions to the position 703 as graphically represented by the arrows in broken lines. Recall, however, that the interpolation is a result of software implemented processing techniques. The embodiment illustrated in FIG. 7 only interpolates inline and crossline, but the technique can be applied to interpolate in the vertical, or z-axis, as well.

Figure 8:
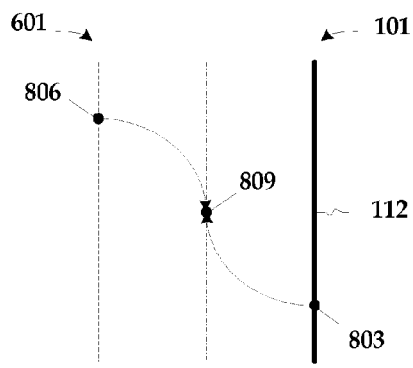
FIG. 8 graphically illustrates an interpolation for a single receiver position alternative to that shown in FIG. 7.

FIG. 8 graphically illustrate an alternative interpolation for a single receiver position 803 in the seismic survey 101 and the corresponding receiver position 806 in the baseline survey 601. The cable separation here exceeds the nominal 110 m-130 m distance over which the interpolation method disclosed above accurately and reliably interpolates/extrapolates in one or more of the inline, crossline, and vertical dimensions. However, the offset does not exceed twice the nominal range, or 160 m. In FIG. 8, the receiver positions 803, 806 are both interpolated/extrapolated in both inline and crossline directions to the position 809 between the two as graphically represented by the arrows in broken lines. Recall, however, that the interpolation/extrapolation is a result of software implemented processing techniques. The embodiment illustrated in FIG. 8 only interpolates/extrapolates inline and crossline, but the technique can be applied to interpolate/extrapolate in the vertical, or z-axis, as well.

Figure 9:
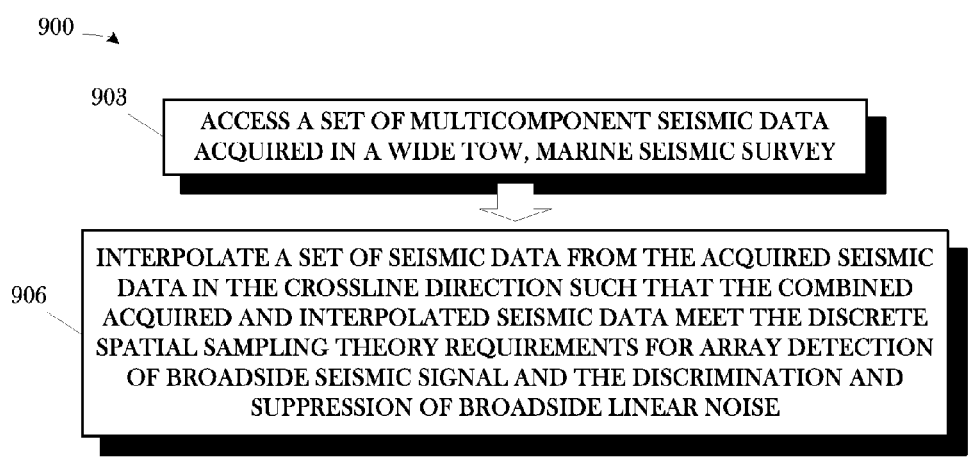
FIG. 9 illustrates one particular embodiment of a method practiced in accordance with another aspect of the present invention.

Thus, in another aspect, the invention includes a method 900, illustrated in FIG. 9, comprising accessing (at 903) a set of multicomponent seismic data acquired in a wide tow, marine seismic survey; and interpolating (at 906) a set of seismic data from the acquired seismic data in the crossline direction such that the combined acquired and interpolated seismic data meet the discrete spatial sampling theory requirements for array detection of broadside seismic signal and the discrimination and suppression of broadside linear noise. In the illustrated embodiment, accessing the acquired seismic data may include accessing legacy data and the acquired seismic data may include pressure and particle motion data. Interpolating the crossline seismic data may include interpolating the crossline data to a position offset from the position at which the acquired data is acquired by approximately 110 m-160 m. Interpolating the crossline seismic data may also include interpolating the crossline data to a point intermediate two crossline positions at which seismic data is acquired from the seismic data acquired at those two crossline positions.

As is apparent above, some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present disclosure therefore addresses some of the novel uses of marine seismic data recorded via towed multi-component receiver cables or streamers that are "wider," or have a greater maximum cable separation, than used in conventional towed arrays. In particular, it reveals the benefits in improved survey efficiency, superior image quality and reduced correlated noise accrued through the acquisition and use of these types of acoustic measurements.

For example, in conventional marine seismic acquisition, seismic cables are commonly towed some 50-100 meters apart. This design specification is rooted in the theory of discrete spatial sampling, which dictates the maximum cable spacing for array detection of broadside seismic signal and the discrimination and suppression of broadside linear noise. The maximum cable separation, in turn, imposes a limit on overall cross-line receiver array coverage, since the total number of seismic cables is constrained by the towing capacity of any given seismic vessel. With additional multi-component measurements along the cables, it is possible to perform interpolation to accurately recover seismic wavefield values between actual data recordings.

Thus, since such interpolation is based on the acoustic wave-equation rather than on discrete spatial sampling theory, crossline cable separation is no longer bound by conventional rules-of-thumb. With wider cable spacing and wider overall receiver arrays, the number of vessel passes required to cover a given survey area decreases, with attendant improvements in survey operating cost and overall acquisition time. Still other benefits may accrue from the use of a "wide" towed array.

For another example, an additional benefit of a wider tow configuration is that a wider receiver array affords greater 3D illumination and angle coverage to any given acoustic reflector. In general this leads to better seismic property resolution in the subsurface, since reflectors which might otherwise be obscured by anomalous acoustic scatterers (e.g. salt) can now be seen through a potentially broader range of viewing angles. A wider range of reflector imaging angles also enhances the resolving power of standard seismic inversion methods such as AVO ("Amplitude Versus Offset") and DHI ("Direct Hydrocarbon Indicators") since the resolution of such attributes depends on having as many different "looks" at the acoustic reflectors as possible. Still other advantages may become apparent to those skilled in the art have the benefit of this disclosure.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method, comprising:
   accessing a set of multicomponent seismic data acquired in a towed-array, marine seismic survey using cable separations exceeding the discrete spatial sampling theory requirements for array detection of broadside seismic signal and the discrimination and suppression of broadside linear noise; and
   interpolating a set of seismic data from the acquired seismic data in the crossline direction such that the combined acquired and interpolated seismic data meet the discrete spatial sampling theory requirements for array detection of broadside seismic signal and the discrimination and suppression of broadside linear noise;
   wherein the accessing and interpolating are performed by a computing apparatus.

2. The computer-implemented method of claim 1, wherein accessing the acquired multicomponent seismic data includes accessing a set of legacy multicomponent seismic data.

3. The computer-implemented method of claim 1, wherein accessing the acquired multicomponent seismic data includes accessing a set of acquired pressure and particle motion related data.

4. The computer-implemented method of claim 1, wherein interpolating the crossline seismic data includes intrapolating or extrapolating the crossline seismic data.

5. The computer-implemented method of claim 1, wherein interpolating the crossline seismic data includes interpolating and extrapolating the crossline seismic data.

6. The computer-implemented method of claim 1, wherein interpolating the crossline seismic data includes interpolating the crossline data to a position offset from the position at which the acquired data is acquired by approximately 110 m-160 m.

7. The computer-implemented method of claim 1, wherein interpolating the crossline seismic data includes interpolating the crossline data to a point intermediate two crossline positions at which seismic data is acquired from the seismic data acquired at those two crossline positions.

8. The computer-implemented method of claim 1, further comprising at least one of:
   archiving the acquired data prior to accessing it; and
   acquiring the acquired data.

9. A program storage medium encoded with instructions that, when executed by a computing device, perform a method, the method comprising:
   accessing a set of multicomponent seismic data acquired in a towed-array, marine seismic survey using cable separations exceeding the discrete spatial sampling theory requirements for array detection of broadside seismic signal and the discrimination and suppression of broadside linear noise; and
   interpolating a set of seismic data from the acquired seismic data in the crossline direction such that the combined acquired and interpolated seismic data meet the discrete spatial sampling theory requirements for array detection of broadside seismic signal and the discrimination and suppression of broadside linear noise.

10. The program storage medium of claim 9, wherein accessing the acquired multicomponent seismic data in the method includes accessing a set of legacy multicomponent seismic data.

11. The program storage medium of claim 9, wherein accessing the acquired multicomponent seismic data in the method includes accessing a set of acquired pressure and particle motion related data.

12. The program storage medium of claim 9, wherein interpolating the crossline seismic data in the method includes intrapolating or extrapolating the crossline seismic data.

13. The program storage medium of claim 9, wherein interpolating the crossline seismic data in the method includes interpolating and extrapolating the crossline seismic data.

14. The program storage medium of claim 9, wherein interpolating the crossline seismic data in the method includes interpolating the crossline data to a position offset from the position at which the acquired data is acquired by approximately 110 m-160 m.

15. The program storage medium of claim 9, wherein interpolating the crossline seismic data in the method includes interpolating the crossline data to a point intermediate two crossline positions at which seismic data is acquired from the seismic data acquired at those two crossline positions.

16. A computing apparatus, comprising:
    a computing device;
    a bus system; and
    a storage communicating with the computing device over the bus system; and
    a software application residing on the storage that, when invoked by the computing device, performs a method comprising:
        accessing a set of multicomponent seismic data acquired in a towed-array, marine seismic survey using cable separations exceeding the discrete spatial sampling theory requirements for array detection of broadside seismic signal and the discrimination and suppression of broadside linear noise; and
        interpolating a set of seismic data from the acquired seismic data in the crossline direction such that the combined acquired and interpolated seismic data meet the discrete spatial sampling theory requirements for array detection of broadside seismic signal and the discrimination and suppression of broadside linear noise.

17. The computing apparatus of claim 16, wherein accessing the acquired multicomponent seismic data in the method includes accessing a set of legacy multicomponent seismic data.

18. The computing apparatus of claim 16, wherein accessing the acquired multicomponent seismic data in the method includes accessing a set of acquired pressure and particle motion related data.

19. The computing apparatus of claim 16, wherein interpolating the crossline seismic data in the method includes intrapolating or extrapolating the crossline seismic data.

20. The computing apparatus of claim 16, wherein interpolating the crossline seismic data in the method includes interpolating and extrapolating the crossline seismic data.

21. The computing apparatus of claim 16, wherein interpolating the crossline seismic data in the method includes interpolating the crossline data to a position offset from the position at which the acquired data is acquired by approximately 110 m-160 m.

22. The computing apparatus of claim 16, wherein interpolating the crossline seismic data in the method includes interpolating the crossline data to a point intermediate two crossline positions at which seismic data is acquired from the seismic data acquired at those two crossline positions.

23. A method, comprising:
    deploying a wide tow array using cable separations exceeding the discrete spatial sampling theory requirements for array detection of broadside seismic signal and the discrimination and suppression of broadside linear noise;
    towing the wide tow array across a survey area in a predetermined pattern; and
    acquiring multicomponent seismic data with the wide tow array as it is towed.

24. The method of claim 23, wherein deploying the wide tow array includes deploying an array of streamers with a maximum cable separation of approximately 110 m-approximately 160 m.

25. The method of claim 23, wherein deploying the wide tow array includes deploying a plurality of streamers, each streamer further comprising a plurality of acoustic sensors and a plurality of particle motion sensors distributed along a cable.

26. The method of claim 23, further comprising deploying a seismic source.

27. The method of claim 23, wherein acquiring the multicomponent seismic data includes acquiring pressure data and particle motion related data.

28. The method of claim 23, further comprising:
    accessing the acquired multicomponent seismic data; and
    interpolating a set of seismic data from the acquired seismic data in the crossline direction such that the combined acquired and interpolated seismic data meet the discrete spatial sampling theory requirements for array detection of broadside seismic signal and the discrimination and suppression of broadside linear noise.

* * * * *